July 24, 1962  DEH C. TAO  3,045,390
LEVELING DEVICE
Filed April 13, 1959
FIG. 2
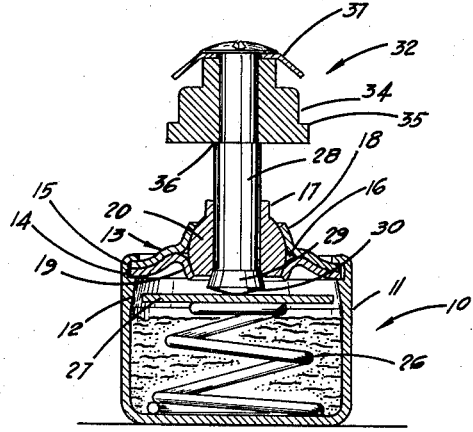
FIG. 3
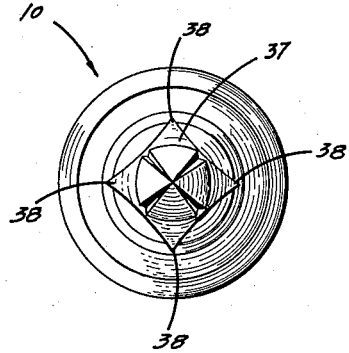
FIG. 4
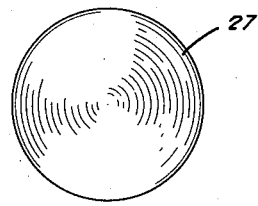
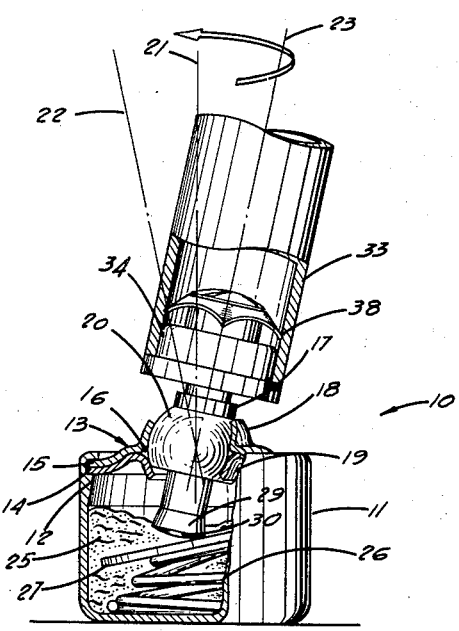
FIG. 1.
INVENTOR
DEH C. TAO
BY
ATTORNEY

United States Patent Office 3,045,390
Patented July 24, 1962

3,045,390
LEVELING DEVICE
Deh C. Tao, Easton, Conn., assignor to The Bassick Company, Bridgeport, Conn., a corporation of Connecticut
Filed Apr. 13, 1959, Ser. No. 806,073
4 Claims. (Cl. 45—139)

This invention relates to leveling devices, and in particular to devices of this type which are automatically adjustable to prevent furniture, machines, or other articles from rocking or tilting when supported on an uneven floor.

Leveling devices have heretofore been proposed for attachment to the bottom of furniture legs so that all of the legs rest firmly on an uneven supporting floor. In general, these devices are either manually or automatically adjustable so that the space separating the bottom of a particular leg removed from the floor may be occupied.

Manual devices usually require that one element of the leveler be adjusted by hand, usually through a screw operation, until the particular leg requiring adjustment is supported on the floor.

Automatic leveling devices usually employ a dashpot arrangement containing a spring and a damping medium. In this class of device, the spring normally forces one element of the leveler away from a second element so that there is a tendency for the device to occupy the entire space between the end of the leg and the floor support upon which the leg is to rest.

In order to prevent undesired rocking of a supported article, the leveler spring is usually contained within a sealed casing filled with a viscous medium. This medium resists sudden forces applied to the leveler so that the adjusting action of the leveler has a relatively slow response.

A principal object of this invention is to provide an automatic leveling device suitable to support an article having tilted legs.

Another object of this invention is to provide a leveling device that is economical to fabricate and reliable in operation, and employing a simple design requiring relatively few internal components which need not be attached one to the other in a fixed manner.

A preferred embodiment of the leveling device of this invention includes a cup-like casing having a flat bottom and containing a viscous damping medium. A bearing providing universal movement is mounted in a protective top cover for the casing. This bearing slidably supports an actuator rod extending into the chamber defined by the casing and cover. In a preferred construction, this rod has a rounded lower end slightly enlarged to limit upward movement of the rod in the bearing.

A helical compression spring is contained in the casing and is immersed in the viscous damping medium. This spring supports a circular metallic disc loosely positioned between the top of the spring and the adjacent lower end of the actuator rod so as to establish a damping plate.

A stop is positioned on the portion of the actuator rod located external to the casing at a point along the rod so as to prevent excessive insertion of the rod into the casing. This stop also forms a seat for a table leg or like device which is to be supported by the leveler. In the event a particular leg is not firmly supported on a surface, the actuator rod compresses the contained spring to the required degree. This adjustment action is damped by the time delay inherent in moving a disc through a viscous medium.

In order that all of the structural features for attaining the objects of this invention may be understood, reference is herein made to the drawings wherein:

FIG. 1 is a fragmentary elevation view of a table leg supported by the leveling device of this invention;
FIG. 2 is a partial sectional view of the leveling device of FIG. 1 showing the internal construction of the device;
FIG. 3 is a plan view of the structure shown in FIG. 2; and
FIG. 4 is a plan view of a disc incorporated within the leveling device.

Referring now to the drawings, leveling device 10 comprises a cup-like casing 11 which may be stamped from relatively thin plate stock. Casing 11 is formed with an annular shoulder 12 that supports a cover 13 which caps the upper opening to casing 11. Cover 13 consists of a lower socket plate 14 and upper socket plate 15. Flanges 18 and 19 formed from the central portions of plates 14 and 15 serve as a bearing or socket 16 to receive a partial ball 20.

Ball 20 is retained within the socket for angular movement about vertical axis 21 in accordance with the limits established by tilt lines 22 and 23. These limits are defined mechanically by the mating of projecting ring 17 with the upper edge of flange 18 as is shown in FIG. 1.

In a preferred embodiment, the tilt angle between lines 21 and 22, and also the tilt angle between lines 21 and 23 may preferably be of the order of 12°. This construction enables leveling device 10 to be associated not only with vertical table legs but also the inclined table legs of present modern design.

The seals between ball 20 and flanges 18 and 19, and also the seal between the outer edge portions of cover 13 and casing 11 must be adequate to contain a viscous damping medium 25 without leaking. The damping medium is preferably a mixture of two parts by weight talc and one part by weight a highly viscous grease sold under the trade name and number "Indopol M–1500." A helical spring 26 is disposed within casing 11 and is immersed in the viscous medium as is shown in FIG. 2. A circular disc 27 is loosely positioned upon the upper coil of spring 26.

An actuating rod 28 extends through ball 20 so that head 29 formed at the lower terminal portion of rod 28 makes loose contact with the upper surface of disc 27. The curved lower end 30 of head 29 rolls and slides freely on the upper surface of disc 27. Head 29 is enlarged, as is shown in the drawings, in order to form a stop defining the extent to which rod 28 may project outwardly. This outward limiting position is shown in FIG. 2.

Leveling device 10 is attached to a table leg, or other furniture to be supported, by an appropriate coupling fixed to the upper shaft portion of actuating rod 28. The coupling 32 shown in the drawing is particularly suitable for attachment to a tubular table leg 33 having a hollow cylindrical construction as shown in FIG. 1. It should be understood, however, that leveling device 10 is readily adapted for use in supporting other forms of table legs through the use of modified couplings.

Coupling 32 comprises a stepped seat 34 and a plate spring 37. Seat 34 is formed with a shoulder 35 which serves as a saddle for tubular leg 33. Seat 34 rests on a shoulder 36 formed from the shank of actuating rod 28. The lower surface of the seat also defines a stop which determines the extent to which actuating rod 28 may project into casing 11. Spring 37 is fixedly positioned on the upper surface of seat 34 by peening over the upper shank portion of actuating rod 28. The four corners 38 of spring 37 are bent downwardly so that table leg 33 may be readily inserted over coupling 32 and seated on shoulder 35 during attachment to leveling device 10. The spring 37 is dimensioned so that corners 38 are bent downwardly slightly during the insertion of leg 33 so that corners 38 bite firmly into the inner surfaces of leg 33. This biting action is sufficient to securely couple the leveling device 10 to a coupling 32.

Certain leveling devices of the prior art employing spring means disposed within a damping chamber are so designed that a viscous medium generates the supporting or leveling forces. In these devices the primary function of the leveling spring is merely to drive an actuating rod, that corresponds generally with rod 28 shown in the drawings, to the maximum outward position. The leveling device herein disclosed, however, is preferably of the type in which the supporting forces are generated by the contained spring, in this instance spring 26, with the viscous medium serving only to dampen or slow the adjusting movements. Accordingly, spring 26 should have adequate strength to support any downwardly directed forces presented thereto by actuating rod 28 through disc 27.

The positioning and operation of the leveling device 10 in response to attachment to a tilted leg is shown in FIG. 1. In this arrangement, ball 20 rotates within socket 16 so that actuating rod 28 is axially aligned with the longitudinal axis of leg 33. Surface 30 of head 29 slides over disc 27 until only the right portion of head 29 assumes contact with the disc. The resulting forces on the disc cause a tilting thereof, as is shown in the drawing, and also corresponding tilting of the uppermost individual coils of spring 26.

It should be understood that the above-described structure is merely illustrative of the principles of this invention, and that numerous modifications may be devised by those skilled in the art without departing from the scope of the invention.

What is claimed is:

1. A leveling device comprising a casing defining a chamber, a cover for the casing provided with a ball-retaining socket, a ball having a bore therethrough and mounted in the socket for limited angular movement, an actuator rod fitted closely and slidably in the bore and having one end terminating within said casing, a spring positioned within the chamber, a disc loosely seated and riding upon the upper portion of the spring, said spring forcing the disc in abutting engagement with said one end of the rod, and a viscous medium in the chamber at least partially surrounding the spring.

2. A leveling device comprising a casing defining a chamber, a cover for the casing provided with a ball-retaining socket, a ball having a bore therethrough and mounted in the socket for limited angular movement, an actuator rod fitted closely and slidably in the bore and having a rounded lower end terminating within said casing, a spring positioned within the chamber, a disc loosely seated and riding upon the upper portion of the spring, said spring constraining said disc in loosely abutting engagement with said rounded lower end of the rod, and a viscous medium in the chamber at least partially surrounding the spring.

3. A leveling device comprising a cup-shaped casing having a circular upper opening, a cover for the casing including a pair of socket plates each formed with a central opening outlined by a socket flange, a ball-retained within the socket formed by the flanges, an actuating rod fitted closely and slidably in a bore passing through the ball, an enlarged head fixed to the terminal portion of the rod positioned within the casing and defining the extent to which the rod projects outwardly from the casing, a helical wire spring positioned within the casing and resting on the bottom thereof, a circular disc loosely seated upon the upper portion of the spring and in slidable engagement with the head of the rod, and a viscous medium in the chamber at least partially surrounding the spring.

4. A leveling device comprising a cup-shaped casing having a circular upper opening, a cover for the casing including a pair of socket plates each formed with a central opening outlined by a socket flange, a ball retained within the socket formed by the flanges, an actuating rod fitted closely and slidably in a bore passing through the ball, an enlarged head fixed to the terminal portion of the rod positioned within the casing and defining the extent to which the rod projects outwardly from the casing, a helical wire spring positioned within the casing and resting on the bottom thereof, a circular disc loosely seated upon the upper portion of the spring and in slidable engagement with head of the rod, a viscous medium in the chamber at least partially surrounding the spring, and a coupling fixed to the terminal portion of the rod located external to the casing and defining the extent to which the rod projects into the casing.

References Cited in the file of this patent
UNITED STATES PATENTS

| | | |
|---|---|---|
| 1,260,181 | Garneo | Mar. 19, 1918 |
| 2,704,663 | Blake | Mar. 22, 1955 |
| 2,836,843 | Gallagher | June 3, 1958 |
| 2,860,368 | Thornsbury | Nov. 18, 1958 |
| 2,871,616 | Sundell | Feb. 3, 1959 |